(12) United States Patent
Hill

(10) Patent No.: US 6,681,513 B2
(45) Date of Patent: Jan. 27, 2004

(54) WEIGHT BELT FOR VERTICAL ORIENTATION OF FISH

(76) Inventor: Gary L. Hill, 7632 State Ridge Blvd., Clinchco, VA (US) 43068

( * ) Notice: Subject to any disclaimer, the term of this patent is extended or adjusted under 35 U.S.C. 154(b) by 0 days.

(21) Appl. No.: 10/141,707

(22) Filed: May 9, 2002

(65) Prior Publication Data

US 2003/0208945 A1 Nov. 13, 2003

(51) Int. Cl.[7] .............................................. A01K 97/00
(52) U.S. Cl. .............................. 43/4; 43/4.5; 119/201; 119/864
(58) Field of Search .................. 43/4, 4.5; 119/769, 119/864, 782, 203, 201, 712; 2/311; 224/103

(56) References Cited

U.S. PATENT DOCUMENTS

| | | | | |
|---|---|---|---|---|
| 1,382,446 A | * | 6/1921 | Warren | 2/311 |
| 3,751,030 A | * | 8/1973 | Winters | 472/129 |
| 3,753,422 A | * | 8/1973 | Seiple | 119/200 |
| 4,791,885 A | * | 12/1988 | Sandlofer | 119/201 |
| 4,808,033 A | * | 2/1989 | Belmonte | 405/186 |
| 4,837,964 A | * | 6/1989 | Aleckson | 43/4 |
| 5,115,519 A | * | 5/1992 | Dalrymple | 2/311 |
| 5,243,710 A | * | 9/1993 | Craycroft | 2/311 |
| 5,600,914 A | * | 2/1997 | Tatar | 43/4 |
| 5,761,843 A | * | 6/1998 | Lynch et al. | 43/4.5 |
| RE35,895 E | * | 9/1998 | Bass et al. | 119/201 |
| 5,913,640 A | * | 6/1999 | Bortner | 405/186 |
| 6,065,238 A | * | 5/2000 | Carter et al. | 43/4 |
| 6,145,476 A | * | 11/2000 | Tempel | 119/203 |
| 6,146,053 A | * | 11/2000 | Nelson | 405/186 |
| 6,389,605 B2 | * | 5/2002 | Srivastava | 2/312 |

* cited by examiner

Primary Examiner—Peter M. Poon
Assistant Examiner—Joan M. Olszewski
(74) Attorney, Agent, or Firm—Jason H. Foster; Kremblas, Foster, Phillips & Pollick

(57) ABSTRACT

A weight belt for maintaining the vertical orientation of a fish which has been rapidly taken from a significant depth and placed in shallow water without time to adjust the amount of air in its air bladder. The belt is placed around the fish between the dorsal fin and the pectoral fins, and has weights at the underside of the fish to maintain its vertical orientation by gravity.

22 Claims, 4 Drawing Sheets

WEIGHT BELT FOR VERTICAL ORIENTATION OF FISH

BACKGROUND OF THE INVENTION

1. Field of the Invention

This invention relates generally to devices used to hold fish after capture, and more particularly to a device for orienting a captured fish vertically to permit the fish to adjust its air bladder gradually.

2. Description of the Related Art

Fish have an air bladder that they use to maintain buoyancy at different water depths. It is known that an air bladder must be inflated when a fish dives deeper, because the greater pressure at the greater depths compresses the air bladder, causing the fish's buoyancy to change. In order to maintain a comfortable level of buoyancy, the fish's body removes air from the respiratory system and moves it to the air bladder. Conversely, a fish moving to a shallow depth must remove air from the air bladder.

Fish that are caught by normal fishing methods, such as a rod, reel, string and hook, often are caught at a significant depth. The fish are raised from that depth and held in a live well in the boat in which the fisherman rides while fishing. The water in live wells is typically one to two feet deep. Therefore, a fish that is caught at a depth significantly greater than one to two feet deep, and which is rapidly raised from that depth, will have to release air from its air bladder while in the live well.

However, a problem arises when fish are placed in a live well after being caught at a significant depth. Their over-inflated air bladders, which are located just behind the pectoral fins at the lower region of the body, are very buoyant at shallow depths and cause the fish to float sideways. Fish typically fight this orientation so hard that their bodies are not capable of releasing the air in their air bladders before the fish thrashes itself into a state of exhaustion, injury or death.

There are numerous methods for aiding the removal of air from fish air bladders. The most direct method is the removal of air by a hypodermic needle inserted through the side of the fish into the air bladder. Air is released through the needle for a brief period, as judged by the person performing this task, and the needle is removed. The disadvantage of this method is that there is no way of knowing with certainty whether enough air has been removed, and therefore the procedure may be ineffective. Furthermore, it is possible to injure or kill the fish by misplacement of the needle, or by the formation of a serious wound.

Other methods include the use of chemicals in the water of the live well in an effort to enhance the removal of air from the air bladders of fish. However, these chemicals, even if they work, are not a natural environment for the fish, and are costly. Furthermore, some live wells have openings that permit water from the body of water in which the boat is floating to enter into and exit out of the live well under the theory that a constant flow of fresh water will be beneficial to the fish. However, this releases chemicals to the environment, and necessitates the addition of even more chemicals to the live well as the chemical-laden water is diluted with new water.

There is a need for a device and method for facilitating the natural inflation and/or deflation of fish air bladders while the fish are held in a live well.

BRIEF SUMMARY OF THE INVENTION

The invention is a device that keeps a fish vertically oriented in water in order to permit the fish to adjust the air in its air bladder. In a preferred embodiment, a belt is mounted circumferentially around the fish between the fish's dorsal and pectoral fins. A weight is connected to the belt at the fish's underside. The weight has sufficient mass to bias the fish toward a vertical orientation.

The preferred belt is elastic, and the preferred invention has means for adjusting the length of the belt, such as a clasp mounted to the belt, thereby permitting adjustment to the length of the belt to cause the belt to seat snugly against the fish.

In the preferred embodiment, a pouch is mounted to the belt, and the weight is inserted into the pouch. If more weight is desired, additional weights can be inserted into the pouch. The pouch is mounted to the belt on a side of the belt that faces away from the fish. Furthermore, the preferred embodiment includes means for connecting the belt to the fish's dorsal fin, such as a fastener mounted to the belt at substantially an opposite side of the belt as the weight.

The invention also contemplates a method of keeping a fish vertically oriented in water. The method comprises mounting a weight to a belt. The weight has a mass sufficient to bias the fish vertically. The belt is placed circumferentially around the fish between the dorsal fin and the pectoral fins. The weight is positioned at the underside of the fish.

In a preferred method, the belt is tightened around the fish an amount sufficient to prevent substantial movement of the belt relative to the fish. A fastener that is mounted to the belt at a position substantially opposite to the weight is inserted through the fish's dorsal fin. The step of mounting the weight to the belt comprises mounting a pouch to the belt and inserting one or more weights in the pouch. In a preferred method, the pouch is mounted on a side of the belt that faces away from the fish.

Figure 1:
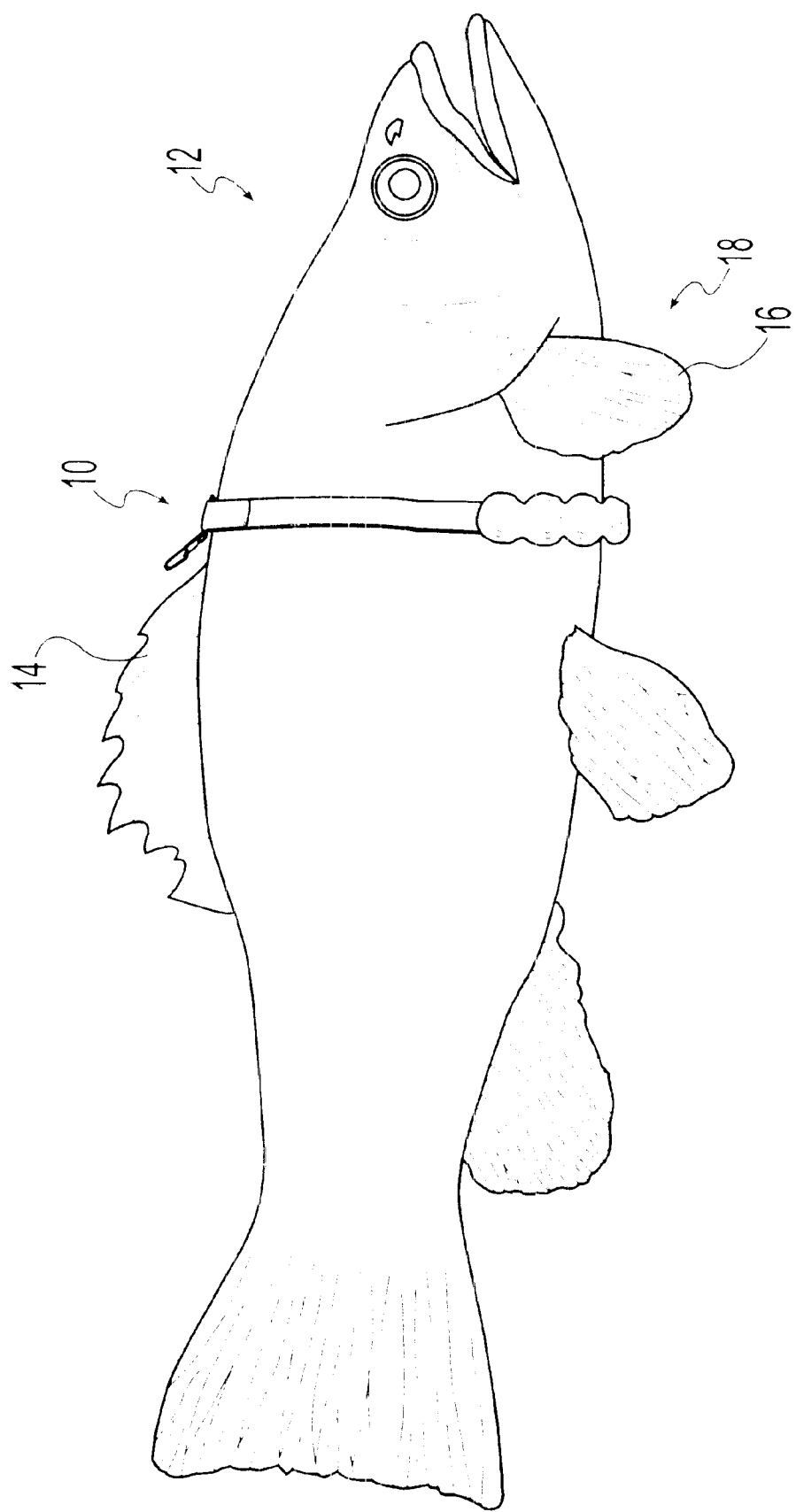
FIG. 1 is a side view illustrating the preferred embodiment of the present invention in an operable position on a fish.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or term similar thereto are often used. They are not limited to direct connection, but include connection through other elements where such connection is recognized as being equivalent by those skilled in the art.

DETAILED DESCRIPTION OF THE INVENTION

The preferred weight belt 10 is shown in FIG. 1 in an operable position on a fish 12. The weight belt 10 preferably extends circumferentially around the fish, positioned longitudinally on the fish between the dorsal fin 14 and the pectoral fins 16 and 18. The weight belt 10 seats snugly against the fish near its midsection, which is the position on the fish having the largest cross-sectional area. This reduces sliding of the belt.

Figure 2:
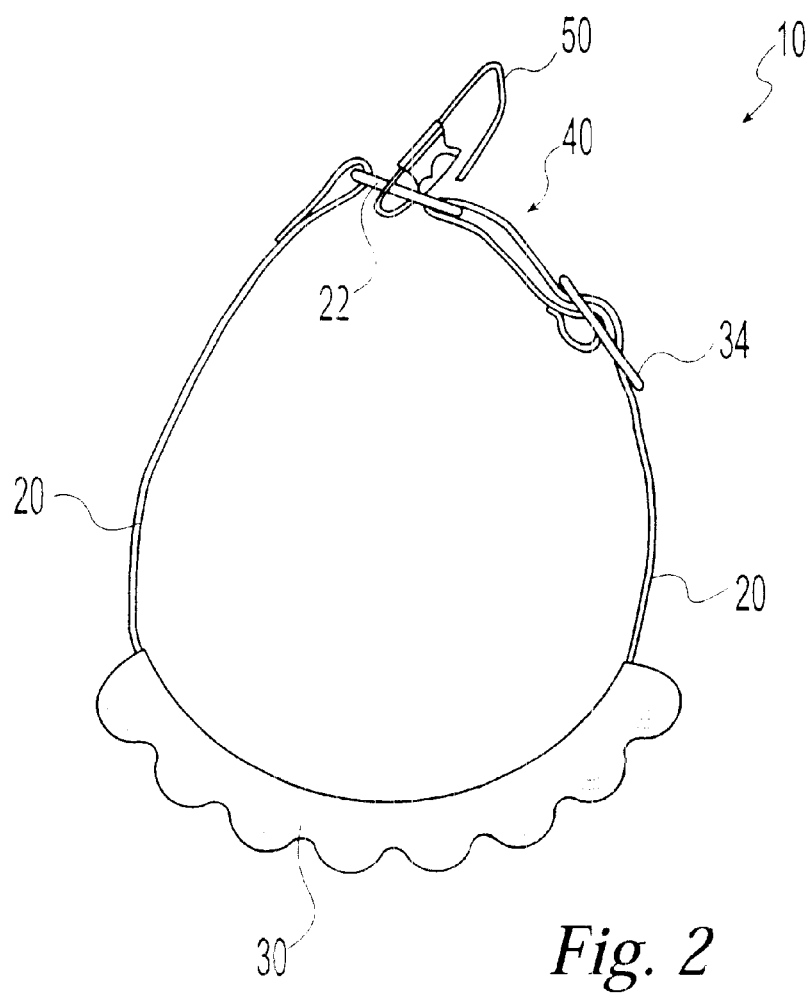
FIG. 2 is a side view illustrating the preferred embodiment of the present invention.
Figure 3:
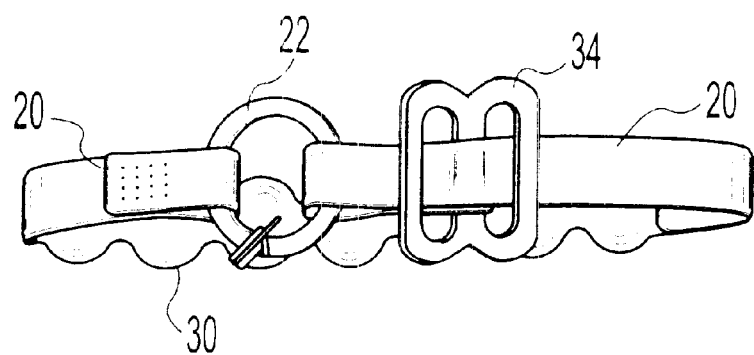
FIG. 3 is a top view illustrating the preferred embodiment of the present invention.
Figure 4:
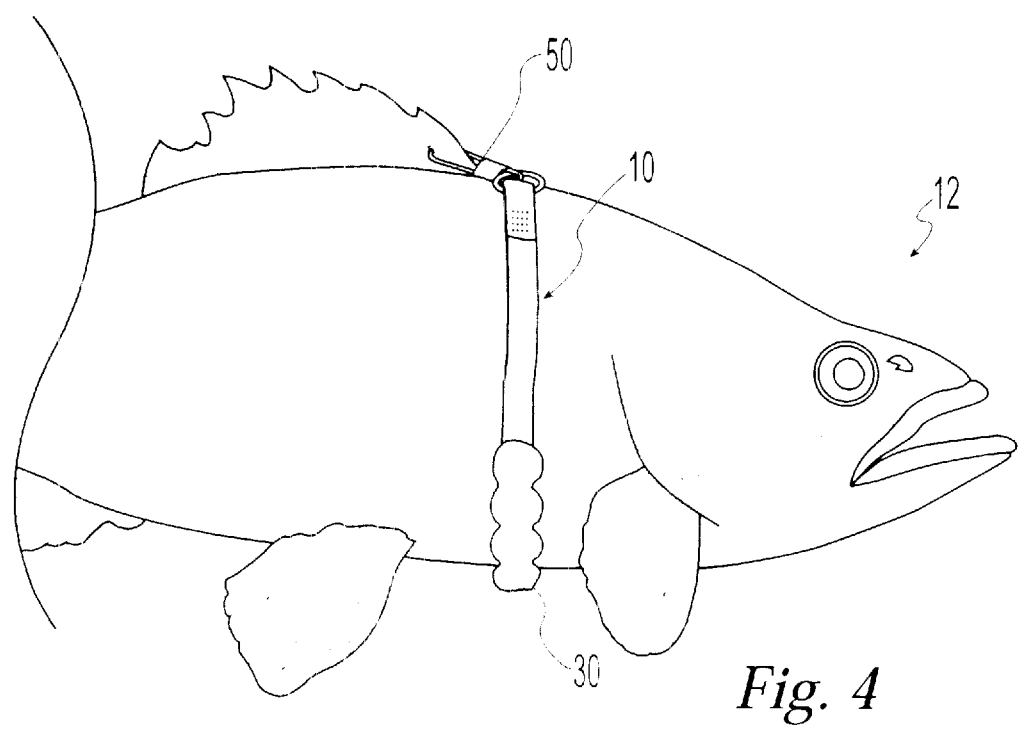
FIG. 4 is a side view illustrating the preferred embodiment of the present invention in an operable position on a fish.
Figure 5:
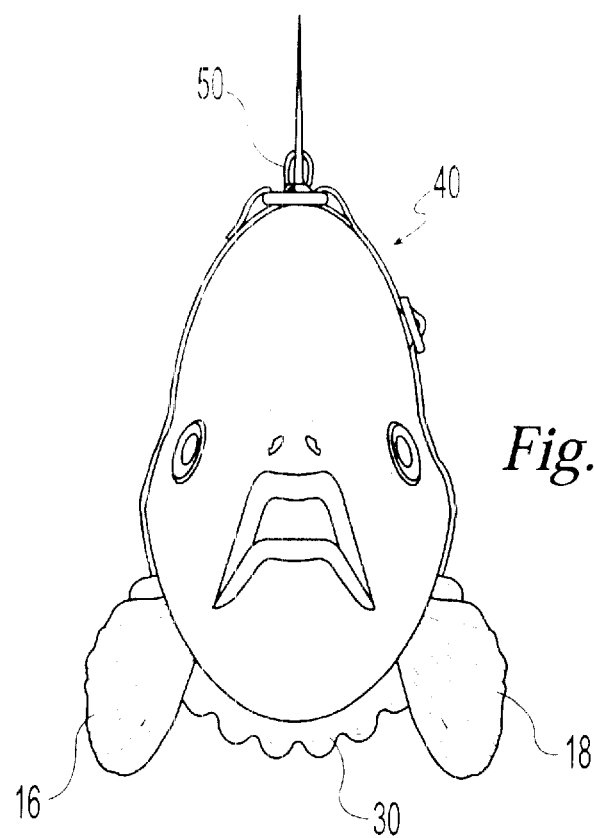
FIG. 5 is a frontal view illustrating the preferred embodiment of the present invention in an operable position on a fish.

In FIGS. 2 and 3 the preferred weight belt 10 is shown alone. A preferably elastic belt 20 extends at one end around a ring 22 and fastens, such as by stitching, welding or other fastener, back onto itself to form a loop around the ring 22. The belt 20 is preferably a fabric with elastic woven into it to provide longitudinal elasticity to the belt 20. Elasticity enhances seating of the belt 20 against the fish's body, which reduces sliding of the belt 20.

The opposite end of the belt 20 from the ring 22 extends through the pouch 30, and is attached thereto, such as by stitching, welding or other fastener. Extending out the opposite end of the pouch 30, the belt 20 passes through a tri-glide slider 34, curves around the ring 22, and extends back through the central member of the slider 34 to form a loop 40 onto itself.

With the configuration described above, the weight belt 10 can be placed around a fish, and the length of the belt 20 can be adjusted by enlarging or shortening the loop 40 that is formed between the ring 22 and the slider 34. Of course, there are many structures other than that preferred that can serve the function of enlarging or shortening a looped belt that extends around a fish. Examples include conventional belt buckles, overlapping hooks-and-loops fabrics, tied strings, snaps, hooks and many other structures too numerous to describe. It will become apparent to the person of ordinary skill in the art that there are many other equivalent structures for adjusting the length of the belt 20, which adjusts the diameter of the belt 20. By decreasing the diameter of the belt 20 once the weight belt 10 is on a fish, the weight belt 10 stays in the same position relative to the fish during use. As the belt 20 is drawn tighter, the probability of relative movement is reduced. However, the belt 20 should not be drawn so tight that the fish is harmed.

The pouch 30 is preferably made of an elastic or otherwise flexible fabric that does not abrade or otherwise harm the fish and forms an enclosure in which weights can be placed and securely retained. The pouch 30 is attached to the belt 20 with the chamber that contains the weights positioned radially outwardly of the belt 20. With this configuration, the smooth and continuous inwardly facing belt 20 surface is not disrupted, and the weights are positioned radially outwardly of the belt 20 when the weight belt 10 is in an operable position. The preferred weights can be balls, elongated rods or strips made of lead or any other dense material in a configuration and composition that can either be arranged in, or bent to conform to, the shape of the underside of a fish, or which is made in such a shape.

The pouch 30 and the weights conform to the shape of the underside of the fish, in order to maintain as low of a profile against the fish's body as possible. This avoids movement of the pouch 30 if the fish on which it is placed is struck by another fish during its captivity, or if the fish strikes an object in the container in which it is being held. Additionally, a low profile minimizes the stress on the fish because the fish is less likely to be affected by the presence of the foreign object.

A fastener, such as an interlock snap 50, is mounted to the ring 22 and slides freely around the ring 22. The snap 50 attaches to the dorsal fin of the fish, as is described below.

Once the fish 12 is caught, it is held in one hand and the other hand passes the weight belt 10 loosely around the fish 12, past the pectoral fins 16 and 18 and seating the rear edge of the top of the belt 20 near or against the front edge of the dorsal fin 14. The pouch 30 is positioned centrally at the underside of the fish 12, so that the center of gravity of the weights in the pouch 30 is as low as possible on the fish.

The belt 20 is tightened so that the entire interior surface of the belt 20 and the pouch 30 seat snugly against the outer surface of the fish 12. This is accomplished by enlarging the loop 40 of the weight belt 10 until a desired tightness is accomplished. A desired tightness is one that prevents the weight belt from sliding significantly relative to the outer surface of the fish 12, but not so tight that the fish's normal functioning is significantly hindered, the fish is harmed or appears in any way to have been deformed by an overly tight belt.

Once the belt is tightened, the snap 50 is opened and the flexible spring wire thereof punctures the membrane between the first and second spines of the dorsal fin 14. The snap is then closed with the snap looped through the dorsal fin, thereby connecting the weight belt 10 to the fish for resisting any significant rotation of the weight belt 10 around the fish, and preventing any forward movement of the weight belt 10. Some forward and rearward movement of the weight belt 10 is not harmful so long as no significant amount of the fish's slime is removed, and so long as the position of the weights on the fish is not other than under the fish. In the preferred position, the weight belt 10 cannot move significantly rearward, because it cannot be stretched over the dorsal fin, and it cannot move significantly forward, because the pectoral fins block the movement.

Any rotation of the weight belt 10 relative to the fish would cause the pouch 30 to be positioned somewhere other than directly under the fish, which is disadvantageous. This is because the purpose of the weights contained in the pouch is to bias the fish toward a vertical orientation. By vertical orientation, it is meant that the fish is oriented with its longitudinal axis substantially horizontal, and its vertical axis substantially perpendicular to the horizon. This is the normal swimming position for fish. In this position, the fish's dorsal fin faces directly upwardly from the earth, and the pectoral fins face directly downwardly.

The weights, under the force of gravity, tend to rotate the fish, if there is any offset from a vertical orientation due to an over-inflated air bladder, so that the center of gravity of the weights is as low as possible. If the weight belt 10 is positioned correctly, this tendency to rotate the fish will give the fish a vertical orientation. This means that the fish's body will be at or nearer the normal orientation for releasing air from its air bladder than it would be without the weight belt 10.

A very large fish will require a weight belt that is relatively larger in diameter and contains more weight than a weight belt used on a very small fish. Additionally, a fish removed from a greater depth will require a greater amount of weight than one removed from a shallow depth. Due to the fact that the invention involves a degree of estimating the amount of weight necessary, there may be situations in which a fish is not kept perfectly vertically oriented at all times due to too little weight. Alternatively, there may be situations in which the fish has too much weight and sinks to the bottom of the live well. This is not harmful, however. Due to the estimation necessary, some fish may be only mostly vertically oriented, due to miscalculation of the amount of weigh. However, such fish will be closer to a vertical orientation than if they had no weight belt to bias them toward a vertical orientation and the bias will permit the fish to adjust its air bladder gradually. Also, for brief moments the fish wearing the weight belt 10 may not be vertically oriented due to sudden movements of the fish or the water even if the weight is correctly matched to the fish. Thus, although the weight belt 10 biases a fish toward a vertical orientation, it will not always be the case that the fish will in fact be kept perfectly vertically oriented. The important factor, however, is that the fish tends to be kept more vertically oriented than without the weight belt 10. And with the weight belt 10, a fish that is initially slightly offset from vertically oriented will, as it adjusts its air bladder, rapidly become vertically oriented as it removes air from its air bladder in the normal process, instead of fighting its offset orientation.

Figure 6:
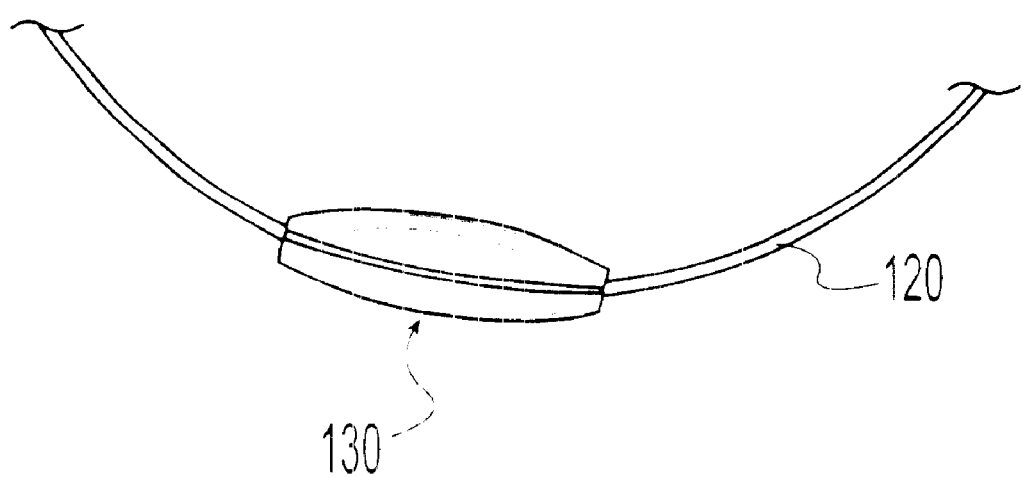
FIG. 6 is a side view illustrating an alternative embodiment.

In addition to the embodiment shown in FIGS. 2 and 3, an alternative embodiment is shown in FIG. 6. The belt 120 is similar to the belt 20 described in the embodiment of FIGS. 2 and 3, and a weight 130 is mounted at the lower end of the belt 120. The weight 130 is a lead sinker with a longitudinal slot into which the belt 120 extends. The weight 130 has been bent to close the slot until the weight 130 clampingly grips the belt 120. Thus, the weight 130 is fixedly mounted to the belt 120.

Although the embodiments shown have belts that extend entirely around the fish, it is possible to use clamping devices that do not extend entirely around the fish to hold the weights to the fish. Such clamping devices however, which use compressive force and friction to hold the weights to the fish, may harm the fish and do not have a reliable grip on a creature with slime on its surface. Thus a belt or other encircling structure is preferred.

While certain preferred embodiments of the present invention have been disclosed in detail, it is to be understood that various modifications may be adopted without departing from the spirit of the invention or scope of the following claims.

What is claimed is:

1. An apparatus for keeping a fish vertically oriented in water, the apparatus comprising:
   a. a belt for mounting around the body of the fish;
   b. a weight connected to said belt, said weight having a predetermined mass; and
   c. means for connecting said belt to a fish's dorsal fin.

2. An apparatus for keeping a fish vertically oriented in water, the apparatus comprising:
   a. a belt for mounting around the body of the fish;
   b. a weight connected to said belt, said weight having a predetermined mass; and
   c. a fastener mounted to said belt at an opposite side of the belt from the weight for mounting said fastener to the fish's dorsal fin.

3. An apparatus for keeping a fish vertically oriented in water, the apparatus comprising:
   a. a belt mounted circumferentially around a fish between the fish's dorsal and pectoral fins; and
   b. a weight connected to said belt at a fish's underside, said weight having a predetermined mass.

4. The apparatus in accordance with claim 3, further comprising means for adjusting the length of the belt.

5. The apparatus in accordance with claim 3, further comprising a clasp mounted to the belt for adjusting the length of the belt to seat the belt snugly against a fish.

6. The apparatus in accordance with claim 5, further comprising a pouch mounted to said belt, said weight being inserted into said pouch.

7. The apparatus in accordance with claim 6, wherein said weight is inserted in the pouch on a side of said belt that faces away from the fish.

8. The combination in accordance with claim 3, wherein the belt is elastic.

9. The combination in accordance with claim 8, further comprising a pouch mounted to said belt, said weight being inserted into said pouch.

10. The apparatus in accordance with claim 9, wherein said weight is inserted in the pouch on a side of said belt that faces away from a fish.

11. The apparatus in accordance with claim 3, further comprising means for connecting said belt to a fish's dorsal fin.

12. The apparatus in accordance with claim 3, further comprising a fastener mounted to belt a belt at substantially an opposite side of the belt as the weight and mounted to said fish's dorsal fin.

13. A method of keeping a fish vertically oriented in water, the method comprising:
   a. mounting a weight to a belt, said weight having a predetermined mass;
   b. placing the belt circumferentially around the fish between the dorsal fin and the pectoral fins; and
   c. positioning the weight at the underside of the fish.

14. The method in accordance with claim 13, further comprising the step of tightening the belt around the fish an amount sufficient to prevent substantial movement of the belt relative to the fish.

15. The method in accordance with claim 13, further comprising connecting a fastener, said fastener being mounted to said belt at a position substantially opposite to said weight, to the fish's dorsal fin.

16. The method in accordance with claim 13, wherein the step of mounting the weight to the belt further comprises mounting a pouch to said belt and inserting a weight in said pouch.

17. The method in accordance with claim 16, further comprising positioning said weights on a side of said belt that faces away from the fish.

18. The method in accordance with claim 16, further comprising the step of inserting a plurality of weights in said pouch.

19. The method in accordance with claim 18, further comprising the step of removing at least one weight from said pouch.

20. An an apparatus for keeping a fish vertically oriented in water, the apparatus comprising:
   a. a weight having a predetermined mass; and
   b. means for mounting said weight to a fish at the fish's underside between the dorsal and the pectoral fins.

21. The apparatus in accordance with claim 20, further comprising a pouch in which the weight is housed.

22. The apparatus in accordance with claim 20, further comprising means for connecting said apparatus to a fish's dorsal fin.

* * * * *